United States Patent [19]

Elias

[11] Patent Number: 5,492,022
[45] Date of Patent: Feb. 20, 1996

[54] METHOD FOR AUTOMATICALLY TESTING MACHINE SAFETY SYSTEM

[75] Inventor: Leonard W. Elias, Highland, Mich.

[73] Assignee: Patriot Sensors and Controls, Clawson, Mich.

[21] Appl. No.: 438,799

[22] Filed: May 11, 1995

Related U.S. Application Data

[62] Division of Ser. No. 933,295, Aug. 21, 1992, Pat. No. 5,415,053.

[51] Int. Cl.$^6$ ................................................ G01M 19/00
[52] U.S. Cl. ................................... 73/865.7; 73/865.9
[58] Field of Search .......................... 73/865.7, 865.8, 73/865.9, 5; 414/1; 901/27, 44; 340/644, 679; 250/224; 356/373, 375

[56] References Cited

U.S. PATENT DOCUMENTS

| | | | |
|---|---|---|---|
| 3,953,770 | 4/1976 | Hayashi | 340/541 X |
| 3,984,733 | 10/1976 | De Lucia | 361/2 |
| 4,361,834 | 11/1982 | King | 340/575 |
| 4,458,115 | 7/1984 | Peterson | 200/61.85 |
| 4,661,797 | 4/1987 | Schmall | 340/561 |
| 5,191,317 | 3/1993 | Toth et al. | 340/676 |

Primary Examiner—Thomas P. Noland
Attorney, Agent, or Firm—Young, MacFarlane & Wood

[57] ABSTRACT

An apparatus for testing an industrial machine safety system that allows the machine to begin operation only when a plurality of safety push buttons have all been depressed, and that stops the machine's operation when any safety push button is released. The apparatus includes an artificial hand that can depress and, upon command, release one of the safety push buttons, and has a release detector for detecting the release of the artificial hand. The release detector operates optically. A lamp directs a light beam along a path that is blocked by a plunger when releasing the safety push button and not blocked when depressing the safety push button. A photodetector detects interruption of this light beam. Thus release of the safety push button is detected upon detection of interruption of the light beam. The machine begins to stop upon release of the safety push button. A motion detector detects the stoppage of the machine. A timer produces either an indication of the time between release of the artificial hand and the stoppage of the machine or a minimum safe distance between the machine and each safety push button as determined by a predetermined maximum hand velocity constant and the time between release of the artificial hand and the stoppage of the machine.

4 Claims, 2 Drawing Sheets

METHOD FOR AUTOMATICALLY TESTING MACHINE SAFETY SYSTEM

This is a divisional of application Ser. No. 08/933,295 filed on Aug. 21, 1992 and now U.S. Pat. No. 5,415,053.

TECHNICAL FIELD OF THE INVENTION

The technical field of this invention is that of safety testing devices, and more particularly devices for testing safety systems of industrial machines.

BACKGROUND OF THE INVENTION

This invention concerns the safety of moving industrial machines. There is a continuing need to provide safety to workers operating these machines. Because it is impractical to place all moving parts of manufacturing apparatuses behind permanent barriers, various techniques have evolved that tend to force safe operation of these machines.

One safety technique used in industrial machines requires that both hands of each machine operator be positively located a safe distance from the machine's moving parts in order for the machine to cycle. Generally, each operator must simultaneously press two push buttons to initiate operation of the machine. Each pair of push buttons is spaced far enough apart to force each operator to use both hands. Release of any one of these push buttons during the closing operation of the machine stops the drive mechanism. Every push button is positioned so far from the machine that the closing operation is stopped before any of the operators' hands can reach a region in the machine where a hand could be trapped or crushed.

One problem with this technique is determining whether the location of each switch provides safety. This determination is based on the maximum distance an operator's hand could move during the time required to completely stop the machine. Standards for hand speed are used in the computation of the minimum distance between each safety push button and any dangerous region (danger zone) of the machine. Such computations require an accurate determination of the interval between the instant one of the push buttons is released and the instant the machine comes to a complete stop. Reliable measurement of this time period is often difficult.

A special purpose measurement apparatus is known in the industrial machine art. The special purpose measurement apparatus measures the time between the initiation of a sequence to release the safety push button and the stoppage of the machine. An electro-mechanical device is placed over one of the safety push buttons. This special purpose apparatus is known as an artificial hand. The artificial hand is manipulated to depress the one safety push button while the other push buttons are being depressed manually in order to start the machine cycle. Upon receipt of a trigger signal, the artificial hand releases the push button. This trigger signal also starts a timer. Motion of the machine is measured using a tachometer attached to the machine via a spring wound cord. While the machine is moving, the tachometer produces a variable d.c. voltage signal whose magnitude corresponds to the industrial machine speed. Machine motion is adjudged stopped when the d.c. signal decreases below a certain level. The timer is stopped when the machine motion has been adjudged stopped. The elapsed time and a standard hand speed determine the minimum safe distance between the safety push buttons and any danger zone of the industrial machine.

There is a flaw associated with the measurement technique described above. There is an inherent time delay between the generation of the trigger signal, which both starts the timer and initiates the release of the one push button, and the actual movement of the safety push button. This release process involves several steps, each of which introduce some variability into the measurement. The trigger device first energizes a relay. This relay, when closed, supplies power to a solenoid in the artificial hand. The solenoid pulls a release mechanism that releases pressure on the safety push button. The safety push button rises because of an internal spring. Because of these delays, the time measured does not accurately represent the time between the release of the one push button and the stoppage of the machine. This variability in the measure of the time to stop the machine causes undesirable uncertainty. Therefore the art needs an automatic testing apparatus for the machine safety system that reduces or eliminates these sources of variability.

SUMMARY OF THE INVENTION

This invention is a method for testing a safety system for an industrial machine. The method employs a pair of safety push buttons for each operator and requires that all of these safety push buttons be depressed at once to initiate the operation of the machine. All of the push buttons must be held down for the machine to continue operation.

The method further employs an artificial hand that can be manipulated to depress and hold down one safety push button and, upon command, release the one safety push button. A release detector is integrated into the artificial hand for detecting the release of the safety push button.

The inventive method allows the machine to begin operation only when all of the safety push buttons have been depressed. The machine's operation is stopped when any of the safety push buttons are released. The method includes depressing one of the safety push buttons using the artificial hand and manually depressing the remaining safety push buttons. Next, the safety push button held by the artificial hand is released, and the release is detected by the system. Finally, machine stoppage is detected, and the interval between detection of the artificial hand release and stoppage of the machine is timed.

BRIEF DESCRIPTION OF THE DRAWINGS

These and other objects and aspects of the present invention will become clear from the following description of the invention, in which.

DETAILED DESCRIPTION OF THE INVENTION

Figure 1:
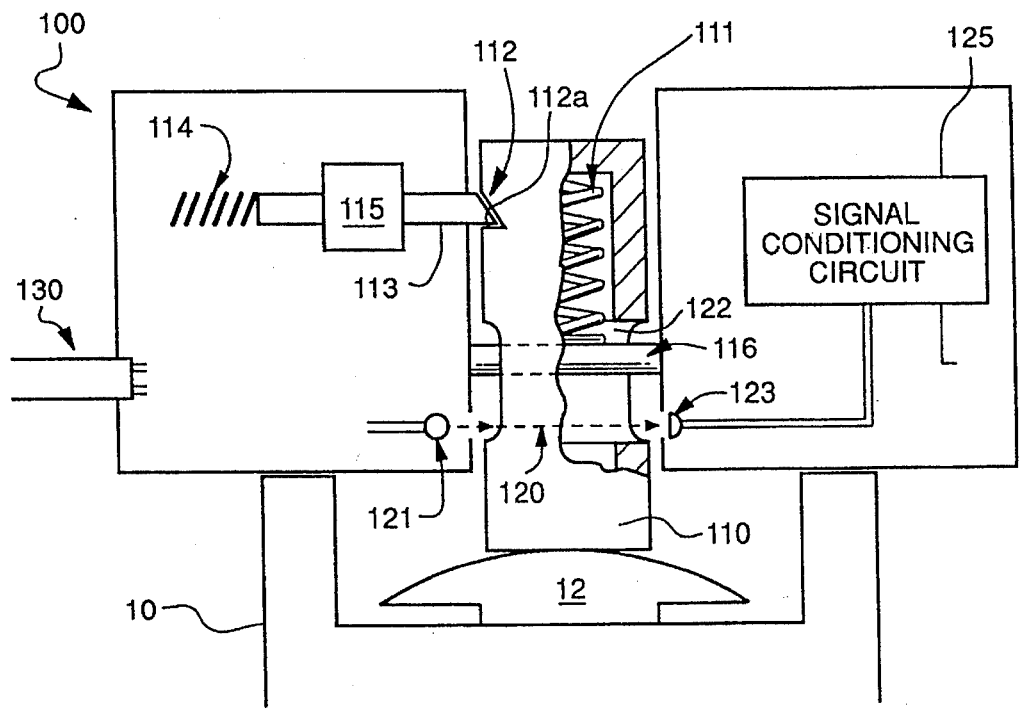
FIG. 1 illustrates in cut away form the artificial hand of the present invention with the safety push button depressed.
Figure 2:
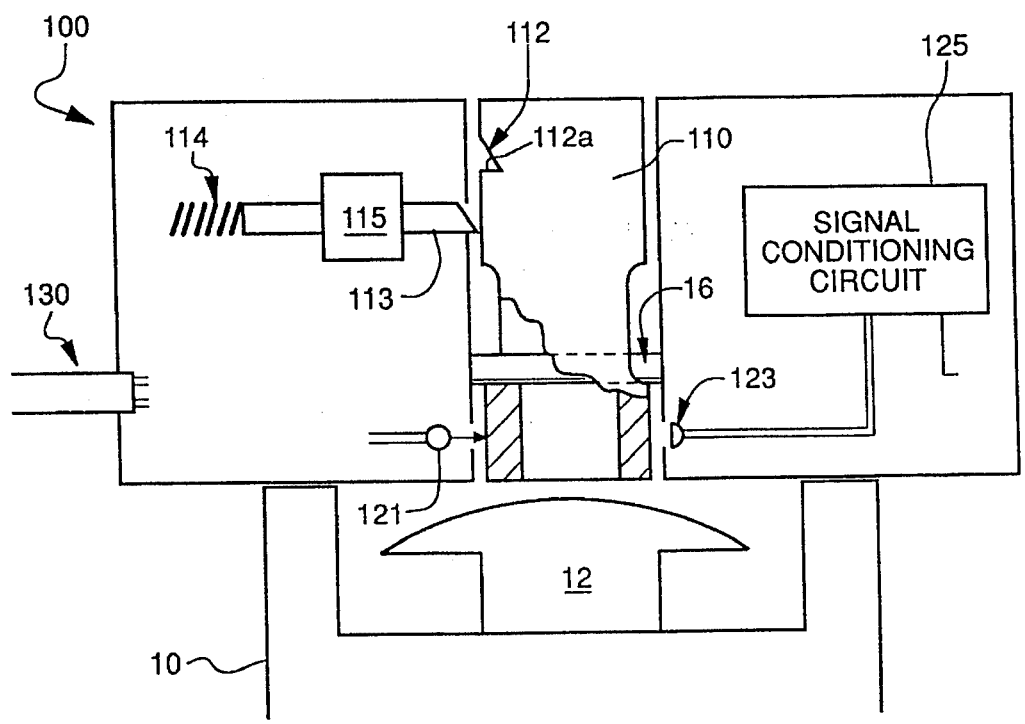
FIG. 2 illustrates in cut away form the artificial hand of the present invention with the safety push button released.

FIGS. 1 and 2 illustrate the preferred embodiment of the artificial hand 100 of this invention. The artificial hand 100 rests on the surface 10 of the industrial machine and covers one safety push button 12. A central plunger 110 is normally urged upwards by a plunger spring 111 acting against support member 116. The safety push button 12 is similarly loaded by an internal spring and extends upwards when not depressed.

FIG. 1 illustrates the artificial hand 100 in the depressed position in which a retainer 133 engages a notch 112 on the central plunger 110. The retainer 113 is forced into the notch in the central plunger 110 by retainer spring 114. In this position central plunger 110 holds down safety push button 12 to emulate the hand of the operator. Note that artificial hand 100 must have sufficient weight to hold down safety push button 12 or the artificial hand must be clamped or held in position over the push button 12.

FIG. 2 illustrates the released position. Starting from the depressed position illustrated in FIG. 1, solenoid 115 is energized. This pulls the retainer 113 back against the retainer spring 114. When the retainer 113 clears the notch 112, the retainer spring 111 lifts the central plunger 110 off of the safety push button 12 to a fully released position. This permits the safety push button 12 to release via its internal spring. This action emulates the action of the operator removing his hand from safety push button 12. This description of artificial hand 100 corresponds to the prior art.

The artificial hand 100 includes an upper opening for the operator to depress the safety button indirectly by way of depressing the top of central plunger 110. When the central plunger has been depressed far enough to align the retainer 113 and the notch 112, the retainer 113 snaps into the notch 112 and is held in place by retainer spring 114. The notch defines an abutment surface 112a which is engaged by the retainer 113. Thus the artificial hand 100 is manually changed from the released position illustrated in FIG. 2 to the depressed position illustrated in FIG. 1.

The configuration of the notch 112 and the retainer 113 to hold the plunger 110 and the push button 12 in the depressed position, as disclosed in the preferred embodiment, does not constitute a unique means for performing the stated function. It should be understood that several equivalent designs are possible, such as having the retainer 113 engage a step or a flange, and this particular design is not intended to limit the scope of the invention.

FIGS. 1 and 2 illustrate the part of artificial hand 100 that permits stop time measurement with reduced variability. A lamp 121 emits a light beam 120, which passes through an aperture 122 in the central plunger 110 to be detected by photodetector 123. The output of the photodetector 123 is coupled to a signal conditioning circuit 125 which in turn generates a digital signal that indicates either receipt or nonreceipt of light beam 120. As shown in FIGS. 1 and 2, the photodetector 123 receives the light beam 120 when the central plunger 110 is in the depressed position, but does not receive the light beam 120 when the central plunger 110 is in the released position because the light beam is blocked by the central plunger 110. As explained below, this provides an indication of the time of release of the safety push button 12.

An electrical cable 130 enters the artificial hand 100. The exact electrical lines between the electrical cable 130 and the solenoid 115, the lamp 121 and the signal condition circuit 125 are omitted for the sake of clarity. These connections are conventional.

Note that FIGS. 1 and 2 illustrate artificial hand 100 disposed on a single safety push button 12. As explained above, machine safety systems employ two such safety push buttons per operator that must be simultaneously depressed to initiate the operation of the machine. During measurement of the stopping interval, the other safety push buttons are depressed manually as they would be during normal machine operation.

Figure 3:
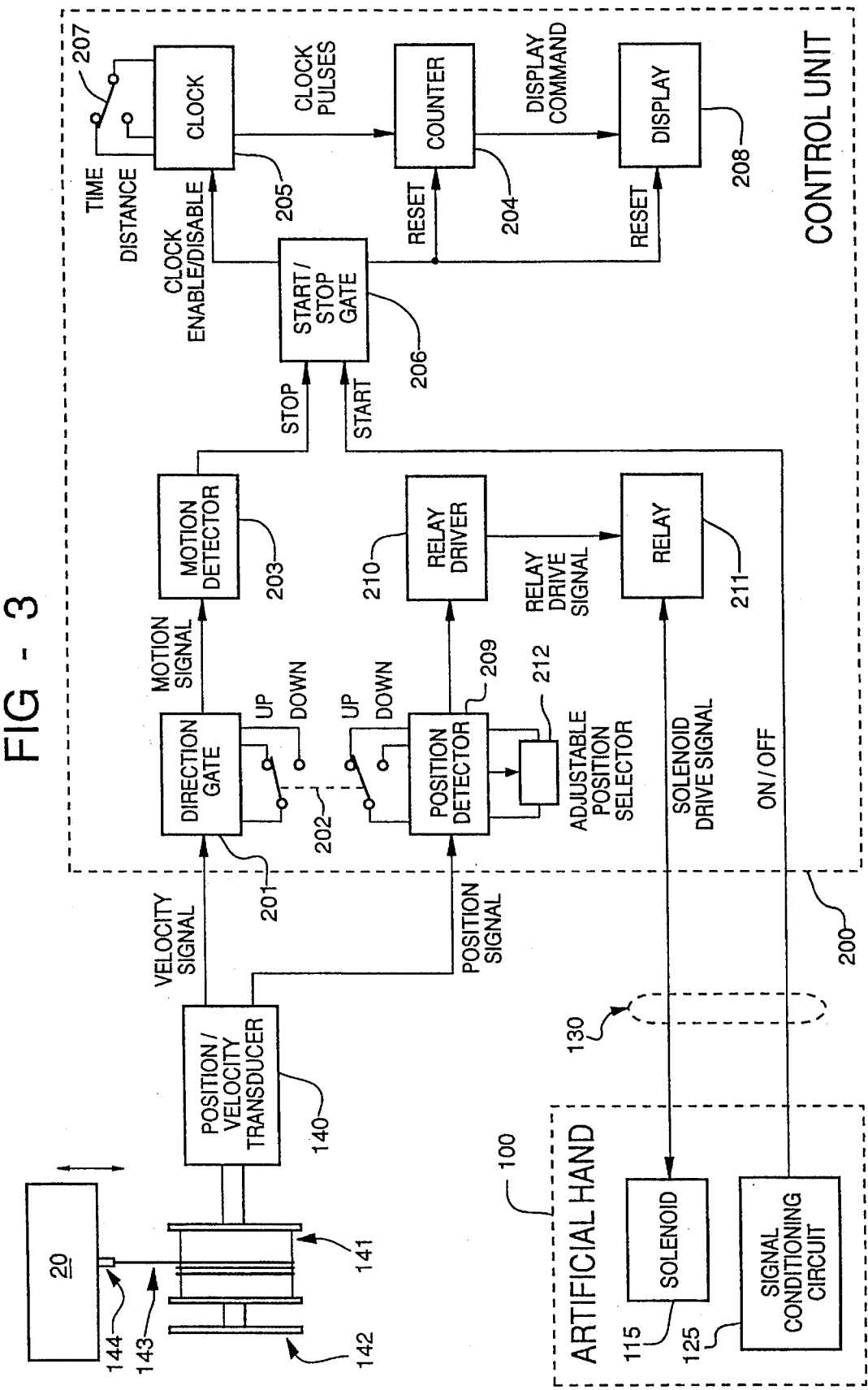
FIG. 3 illustrates in block diagram form the apparatus of this invention.

FIG. 3 illustrates in block diagram form a circuit for implementing the invention. The complete system includes the artificial hand 100, a position/velocity transducer 140, a take-up reel 141 and a spring 142, and a control unit 200. The cable 130 carries an ON/OFF signal that indicates the noninterruption or interruption of the light beam 120 from the artificial hand 100 to the control unit 200. The cable 130 also carries the drive signal for the solenoid 115 between the control unit 200 and the artificial hand 100.

The purpose of the position/velocity transducer 140 is to generate electrical signals that indicate both the position and velocity of a reciprocating member 20 of the industrial machine. The take-up reel 141 is temporarily coupled to the reciprocating member 20 of the machine via a cord 143 and attachment device 144. The rewind spring 142 keeps the cord 143 taut and causes take-up reel 141 to rotate with the reciprocation of the member 20. The position/velocity transducer 140 includes a prior art process to detect the instantaneous position, direction and velocity of the rotation of take-up reel 141. The position and direction of the machine are important when safety testing reciprocating devices. A press, for example, is very dangerous when its ram is at the midpoint of its downward stroke, having its greatest velocity and approaching its closed position. It is at this point that the stopping time should be determined. The transducer 140 generates a first variable d.c. output signal, polarized to reflect direction, to indicate the velocity of the take-up reel and, indirectly, the velocity of the reciprocating member 20 of the machine. A second variable d.c. output signal produced by the transducer, also polarized to reflect direction, indicates the position of the take-up reel and the reciprocating member of the machine.

The position/velocity transducer 140, the take-up reel 141, the rewind spring 142, and the cord 143 with attachment device 144 are all elements used in the preferred embodiment of the invention for use with reciprocating machines. Alternative embodiments allow the invention to be used with non-reciprocating industrial machines. In one prior art embodiment where position is not a critical parameter a tachometer is coupled to a rotating member of a machine via a flexible wheel. This method allows the tachometer to determine the direction and velocity of rotation of the machine. There are other applications and methods for determining the speed, position, and direction of motion of a machine, and the scope of this invention should not be limited to the embodiments discussed above.

The control unit 200 receives input signals from the position/velocity transducer 140 and from the signal conditioning circuit 125 and measures the interval between the release of the push button 12 and the stoppage of the machine. In the preferred embodiment the control unit 200 is a self-contained, portable unit that is coupled to the artificial hand 100 and the position/velocity transducer 140 via suitable plug-in cables.

Once the central plunger 110 is depressed and the machine begins to operate, the position/velocity transducer 140 starts the measurement process. The position/velocity transducer 140 sends a position signal to a position detector 209 and a velocity signal, polarized to indicate the direction of travel of the machine, to a direction gate 201. The direction of travel and the position of the machine must be selected by a direction switch 202 and an adjustable position selector 212 respectively. When the position signal corresponds to the settings of the direction switch 202 and the adjustable position selector 212, position detector 209 sends a signal to enable a relay driver 210. The relay driver 210 in turn energizes the coil of a relay 211, closing the relay's contacts. When closed, the relay 211 supplies the electrical power to the solenoid 115 which pulls the retainer 113 out of the notch 112 to release the central plunger 110.

The release of the central plunger 110 has two consequences. First, this releases the safety push button 12 and thus triggers the safety stop operation of the machine 10. At the same instant, central plunger 110 blocks the light beam 120 from reaching the photodetector 123. Upon determination that the photodetector 123 is not receiving the light beam 120, the signal condition circuit 125 sends a START signal to a start/stop gate 206 indicating that light beam 120 is blocked.

The direction gate 201 receives the variable d.c. voltage velocity signal from position/velocity transducer 140 and discriminates the direction of motion sensed by D.C. tachometer 140 based on the polarity of the d.c. signal. If the polarity of the velocity signal corresponds to the direction as selected with the direction switch 202, then the direction gate produces a non-polarized motion signal representing the velocity of the reciprocating member 20. If the velocity signal disagrees with the setting of switch 202, then no output is produced.

The motion detector 203 indicates when the machine stops moving, making this determination based upon the level of the motion signal produced by the direction gate 201. If this level is greater than a certain threshold, then no STOP signal is produced by the motion detector 203. If the level of motion signal decreases below the threshold, then a STOP signal is sent to the start/stop gate 206. The threshold level is set with regard to the variable d.c. voltage signal produced by position/velocity transducer 140 to detect when the speed of the industrial machine reaches a suitably slow velocity.

The start/stop gate 206 controls the operation of a clock 205, a counter 204, and a display 208 according to the presence of the START signal sent by the signal conditioning circuit 125 or the STOP signal sent by the motion detector 203. The receipt of a START signal and the absence of a STOP signal, indicating that the machine is in the correct position and moving in the correct direction and that the safety push button has been released, begins the timing process. First, the start/stop gate 206 produces a reset signal for the counter 204 and the display 208 which sets each device to zero conditions. Next, the start/stop gate 206 sends a clock enable signal to the clock 205 which allows the clock 205 to begin producing clock pulses. Upon receipt of each clock pulse, the counter 204 increments its count and sends a display signal to the display 208. The display 208 shows the current count of the counter 204, and continually updates the display as it receives the display signal from the counter 204. Upon receipt of a STOP signal from the motion detector 203 indicating that the machine has stopped, the start/stop gate 206 issues a clock disable signal to stop the clock's production of pulses. Then the counter 204 stops and the display shows the last update.

A time/distance switch 207 determines the frequency of the clock pulses. To correctly measure the time or distance, the time/distance switch 207 must be set before the timing interval begins. Depending on whether the switch 207 was set for time or distance, the display 208 provides a visual indication of either the time that it, took to stop the machine or the distance that a hand travelling at the predetermined hand speed velocity could have moved in the time that it took to stop the machine. The period of each clock pulse is determined by the smallest increment displayed. For example, if the smallest indication of time is one millisecond, then the period of the clock pulse is one millisecond. If the smallest indication of distance is one tenth of an inch then the period would be the time required for a hand to move one tenth of an inch at the predetermined hand speed. In the preferred embodiment, the display 208 consists of several seven segment digits formed of light emitting diodes or liquid crystal displays.

This technique provides an accurate and reliable method for testing the safety system of the machine. Starting the timed interval upon release of safety push button 12 detected by interruption of light beam 120 by central plunger 110 eliminates most of the variability in the process. Note that this system does not time ally delay between triggering the measurement process via position/velocity transducer 140 and release of central plunger 110. The measured time is the interval between the release of a safety button 12 and stoppage of the machine; this time is the same with the automatic testing system of this invention as with normal anticipated use.

Those skilled in the art would realize there are several alternative means to practice this invention. In particular, it is feasible that a single microprocessor integrated circuit, when appropriately programmed, could serve the functions of direction gate 201, motion detector 203, counter 204, clock 205, start/stop gate 206, position detector 209, and relay driver 210.

I claim:

1. A method for testing an industrial machine safety system that allows the machine to begin operation only when a plurality of safety push buttons have all been depressed, and that stops the machine's operation when any safety push button is released, the method comprising the steps of:

depressing one of the plurality of safety push buttons via an artificial hand;

manually depressing the others of the plurality of safety push buttons;

releasing the safety push button held by the artificial hand;

detecting the release of the artificial hand;

detecting the stoppage of the industrial machine; and timing the interval between the detection of the release of the artificial hand and the stoppage of the moving industrial machine.

2. The method as claimed in claim 1, wherein:

the step of depressing one of the safety push buttons via an artificial hand includes retaining a plunger in a position depressing the one of the safety push buttons via a retainer; and the step of releasing the safety push button held by the artificial hand includes releasing the retainer and urging the plunger to a release position.

3. The method as claimed in claim 2, wherein the step of detecting release of the artificial hand includes:

directing a light beam along a path that is blocked by the plunger when releasing the one of the safety push buttons and not blocked by the plunger when depressing the one of the safety push buttons, and detecting interruption of tile light beam, whereby release of the artificial hand is detected upon detection of interruption of the light beam.

4. The method as claimed in claim 1, wherein the step of detecting the stoppage of the industrial machine includes:

rotatably coupling a velocity transducer to a reciprocating part of the machine, producing a variable d.c. voltage signal proportional to the velocity of the machine and polarized with respect to the direction of motion of the machine, and comparing the variable d.c. voltage signal to a predetermined threshold value corresponding to the stoppage of the machine.

* * * * *